(12) United States Patent
Cadorin et al.

(10) Patent No.: US 9,179,802 B2
(45) Date of Patent: Nov. 10, 2015

(54) MIXING OR CUTTING MACHINE, PARTICULARLY FOR FOOD PROCESSING, OPERATING WITH PLANETARY SHAFT

(75) Inventors: Paolo Cadorin, Belluno (IT); Francesco Pinto, Trieste (IT)

(73) Assignee: Firex S.r.l., Sedico BL (IT)

( * ) Notice: Subject to any disclaimer, the term of this patent is extended or adjusted under 35 U.S.C. 154(b) by 228 days.

(21) Appl. No.: 13/876,792

(22) PCT Filed: Sep. 27, 2011

(86) PCT No.: PCT/IB2011/054238
§ 371 (c)(1),
(2), (4) Date: Mar. 28, 2013

(87) PCT Pub. No.: WO2012/042465
PCT Pub. Date: Apr. 5, 2012

(65) Prior Publication Data
US 2013/0206879 A1     Aug. 15, 2013

(30) Foreign Application Priority Data

Sep. 29, 2010   (IT) .............................. BL2010A0016

(51) Int. Cl.
*A47J 43/08* (2006.01)
*B01F 7/30* (2006.01)
*B01F 13/10* (2006.01)
*B01F 7/16* (2006.01)

(52) U.S. Cl.
CPC ............. *A47J 43/085* (2013.01); *B01F 7/1695* (2013.01); *B01F 7/30* (2013.01); *B01F 13/1044* (2013.01); *B01F 7/162* (2013.01); *B01F 2013/108* (2013.01)

(58) Field of Classification Search
CPC ........ A47J 43/046; A47J 43/08; A47J 43/085
USPC ........................................... 241/282.1, 282.2
See application file for complete search history.

(56) References Cited

U.S. PATENT DOCUMENTS

2009/0114616 A1   5/2009  White et al.

FOREIGN PATENT DOCUMENTS

| EP | 2 092 975 A2 | 8/2009 |
|---|---|---|
| FR | 1 056 105 | 2/1954 |
| GB | 686 771 | 1/1953 |
| JP | 57 030535 | 2/1982 |
| JP | 58 190114 | 12/1983 |
| JP | 2000 288375 | 10/2000 |
| SU | 887 203 | 12/1981 |

*Primary Examiner* — Mark Rosenbaum
(74) *Attorney, Agent, or Firm* — Alan G. Towner, Esq.; Pietragallo Gordon Alfano Bosick & Raspanti, LLP

(57) ABSTRACT

Disclosed is a machine for stirring, cutting, cooking or processing food under modified atmosphere. A drive shaft is provided in the mixing machine, for putting the product into rotary motion in the processing bowl, said drive shaft having a lower power take-off and being vertically supported by a liner which is integral with the base of the bowl, whereas the opposite end of said shaft is integral with a hub having at least one radial arm, with a liner fitted thereto for supporting and guiding a secondary vertical arm, which may be used for cutting or emulsifying food product, which shaft is integral with a pinion meshing with a crown wheel, said crown wheel being fitted to a sleeve which is coaxial and integral with supporting and guiding liner for the shaft, whereas each secondary shaft may be equipped with at least one epicyclically driven, high-speed mixing or processing tool.

9 Claims, 3 Drawing Sheets

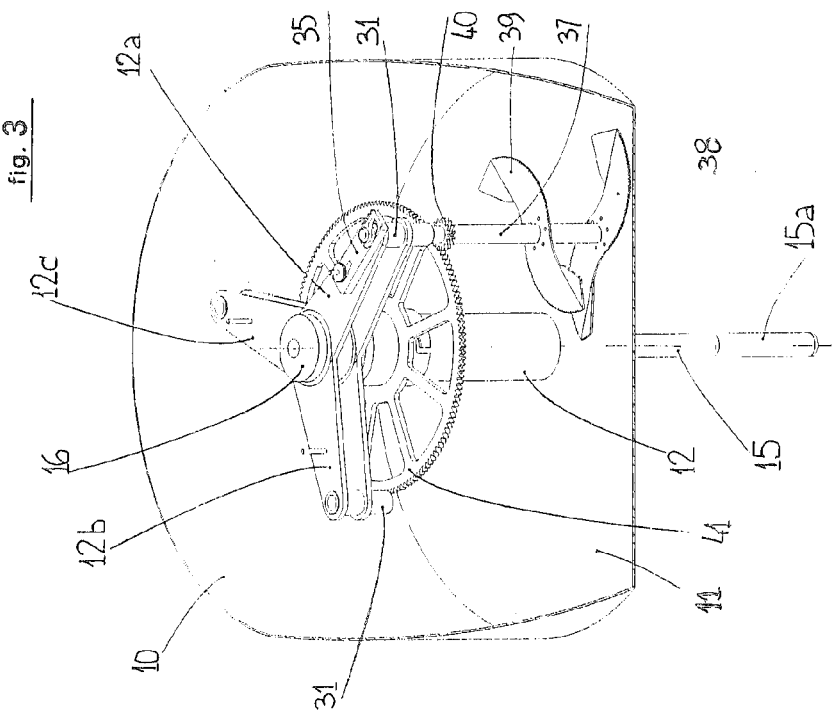
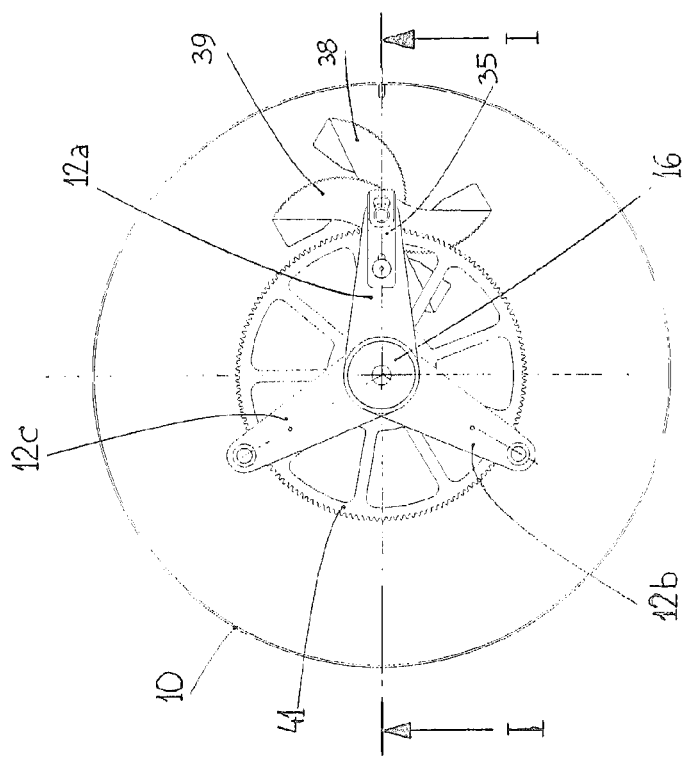

MIXING OR CUTTING MACHINE, PARTICULARLY FOR FOOD PROCESSING, OPERATING WITH PLANETARY SHAFT

CROSS-REFERENCE TO RELATED APPLICATIONS

This application is a U.S. National Stage Application under 35 U.S.C. Section 371 of PCT International Application No. PCT/IB2011/054238, filed Sep. 27, 2011, which claims the benefit of priority application IT BL2010A000016, filed Sep. 29, 2010, which are incorporated herein by reference as if set forth in their entirety.

FIELD OF THE INVENTION

The present invention relates to a novel machine for stirring, mechanically cutting, mixing, cooking or processing food, particularly under modified or controlled atmosphere.

The main characteristic of the present invention consists in that a single drive shaft is provided in the mixing machine, for putting the product to be mixed into rotary motion in the circular processing bowl, said main or planetary drive shaft having a lower power take-off and being vertically supported and guided by a liner which is integral with the base of the bowl, whereas the opposite end of said shaft is caused to be integral with a hub having at least one radial arm, with a liner fitted thereto for supporting and guiding a secondary or satellite vertical arm, to be used, for instance for cutting or emulsifying the food product being processed, which satellite shaft is integral with a pinion directly meshing with a crown wheel, said crown wheel being fitted to a sleeve which is coaxial and integral with the planetary shaft supporting and guiding liner, whereas each satellite shaft may be equipped with at least one mixing or mechanical processing tool, said tool being epicyclically driven at high speed.

BACKGROUND INFORMATION

Industrial mixing, emulsifying, fine cutting processes, particularly for food preparation but also in other industrial fields, are generally aimed at producing stable emulsions of liquid and powder materials, or materials having different viscosities, possibly by crushing of components in solid or lump form and sometimes operating at water or other liquid evaporation temperatures, as well as under modified and controlled atmosphere, to obtain a mix that maintains its organoleptic and physical properties unaltered with time.

A number of product mixing and processing systems are known which are designed for food preparation, ranging from the traditional blender to large stirrers, as also used in the confectionery industry, e.g. for chocolate production. All these mixers are substantially based on the concept of stirring and rotating the material to be processed in a cylindrical container, thereby causing it to hit or at least abut against at least one tool for cutting or mixing it, and thus provide a homogeneously mixed product.

In a long-known prior art technique, a dispersion mixer is provided, which has a cylindrical container, with an axial drive shaft mounted to its upper opening and equipped with axial mixing tools, as well as a secondary drive shaft having a different rotation speed, for rotating other mixing tools cooperating with a lateral scraper, as disclosed in EP 0 048 134, by Burgess, dated 1981.

This solution has proved to involve high power consumption, due to the requirement of supplying power to two separate motors, and to not allow the use of a hermetic sealing lid for modified atmosphere processing.

A first known variation of this solution provides a fixed-container mixer having no central shaft, but a series of peripheral shafts which are rotated by a central sleeve with a crown wheel through appropriate pinions which can impart a high rotation speed to the tools of each shaft, as disclosed in EP 0 096 136 by Couvroit, dated 1982. In this solution, each mixing shaft also has the task of dragging the product into circular motion within the bowl, which requires a great driving force, and no hermetic lid sealing is allowed, for controlled temperature and atmosphere processing.

A more recent technique turned back to the use of a central shaft driving a number of radial mixing tools, as disclosed in EP 0 829 891 by Deboffles, dated 1998 or in EP 0 925 891 by Schneider, dated 1998, which all have a single motor disposed on the outer surface of the bottom of the bowl, ensuring a more balanced power consumption relative to the low number of revolutions of the drive shaft and to the multiplied number of revolutions of each mixing tool. Nevertheless, also in this more recent technique, there is the drawback that the bottom of the bowl cannot be heated, which involves the difficulty of reaching a uniform temperature of the product being processed, and that complex machines are required, having high maintenance requirements.

Yet in another newer technique the control of the central shaft and the mixing shafts is disposed on the lid, with the planetary drive being provided by a single motor, as disclosed in EP 1 719 552 by Tonelli dated 2006, or with two motors acting on container rotation and on tool rotation respectively, as disclosed in EP 2 219 770, by Stahl, dated 2008. While this technique improves the previous one in terms of power consumption, it still suffers from the above mentioned drawbacks, particularly due to the lid-mounted control, which makes it unusable for modified atmosphere processing.

In almost all the above prior art solutions, the provision of two motors involves the problem of a considerable bulk, as well as considerable power requirements, particularly for the mixing tool driving motor, whereby considerable power losses are involved for matching the speeds of the two shafts with the various processes or treatments.

Finally, even in the solutions that use a single driving motor, the complexity of current rotary drive systems causes serious drawbacks in terms of wear and difficult maintenance.

SUMMARY OF THE INVENTION

The main object of the present invention is the provision of a machine for stirring or cutting materials to be mixed, which uses a single motor both for low rpm driving of a planetary shaft, for rotating the mass to be processed, and for high rpm driving of each satellite shaft, for rotating the stirring or cutting tool for the same mass being processed, thereby optimizing its power consumption, particularly under modified temperature and/or atmosphere conditions, suitable for the type of product being processed.

Within this purpose, an important object of the invention is to provide a machine as mentioned above that has lower space requirements for its driving system, particularly on the bottom of the container, to allow such bottom to be also used as an additional heating surface, that ensures a more uniform and quicker heating of the mass being processed.

A further object of the present invention is to allow the lid or top of the mixing bowl to receive devices that allow mixing under modified atmosphere, e.g. vacuum, and to allow simple and functional use of said lid.

Yet another object of the present invention is to ensure simple and quick operation in the maintenance or replacement of mixing tools or in maintenance in general and in the adjustment of the relative speed of the central shaft and satellite shafts.

These and other objects are fully fulfilled by the present invention which provides a single central drive shaft in the mixing machine, for putting the product to be mixed into rotary motion in the stationary circular processing bowl, said main or planetary drive shaft having a lower power take-off and being vertically supported and guided by a liner which is integral with the base of the bowl, whereas the opposite end of said shaft is caused to be integral with a hub having at least one radial arm, with a liner fitted thereto for supporting and guiding a secondary or satellite vertical arm, to be used, for instance for cutting or emulsifying the food product being processed, which satellite shaft is integral with a pinion directly meshing with a crown wheel, said crown wheel being fitted to a sleeve which is coaxial and integral with the planetary shaft supporting and guiding liner, whereas each satellite shaft may be equipped with at least one tool for mixing or mechanically processing the product being processed, said tool being epicyclically driven at high speed.

BRIEF DESCRIPTION OF THE DRAWINGS

An improved understanding of the present processing method and a better explanation of how the above objects are fulfilled are described and shown in greater detail below, by reference to a succession of steps as set forth in a merely illustrative and non-limiting form, and with the help of 5 diagrammatic figures in three drawings annexed herewith, in which:

FIG. 2 is a plan view of the mixer of FIG. 1, with the lid thereof omitted;

FIG. 3 is a perspective, broken-away view of the mixer of FIGS. 1 and 2;

In all the above figures, like parts are represented, or intended to be represented, by like reference numerals.

DETAILED DESCRIPTION

Figure 1:
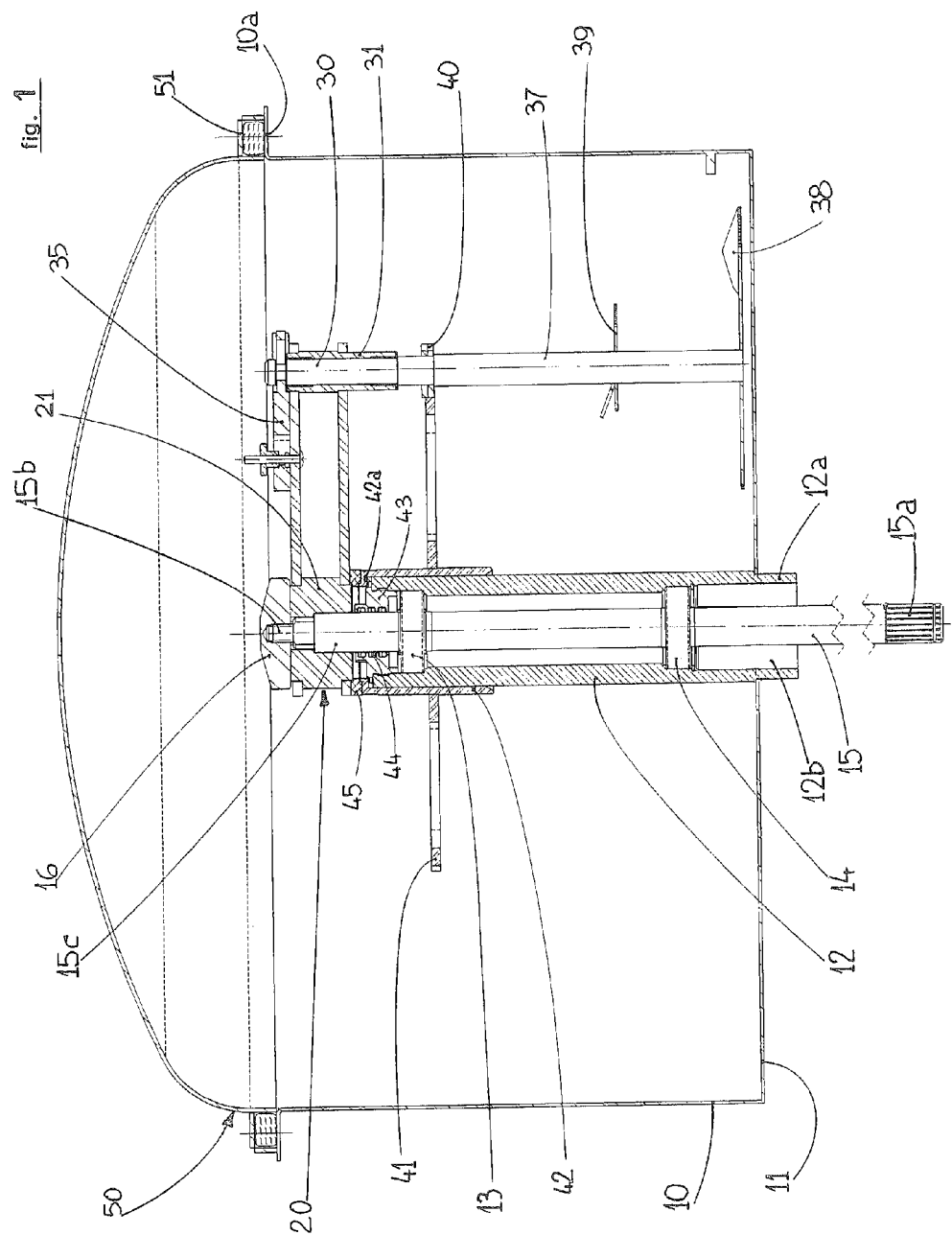
FIG. 1 is an axially sectional view of a mixer of the present invention, as taken along the section plane I-I of FIG. 2.

Referring to the above figures, a cylindrical bowl (10) containing the product to be mixed has a bottom (11) integrally joined to an axial liner (12), which may comprise an outer portion (12a) projecting out of the bottom and anyway extending over almost the entire length of the bowl (10).

Two bearings (13-14) are placed in the bore (12b) of said liner (12), for supporting and guiding the rotation of a shaft (15), whose lower end (15a) has a power take-off for connection to a gearmotor (not shown), which gearmotor imparts the desired rotary motion thereto.

According to the construction embodiment of FIG. 1, the opposite end (15b) of the same drive shaft (15) is located at such a height as to indicatively reach the upper edge of the bowl (10) and is suitably threaded to be held in and closed by an end cap (16).

Such cap (16) screws onto the end (15b) of the drive shaft (15) thereby pressing the underlying hub (21) of the support (20) for the satellite shafts (30) which hub (21) is backed up by the shoulder (15c) of the shaft (15) itself, with which it is unremovably joined, possibly also keyed, to rotate at the same speed as the latter.

Figure 5:
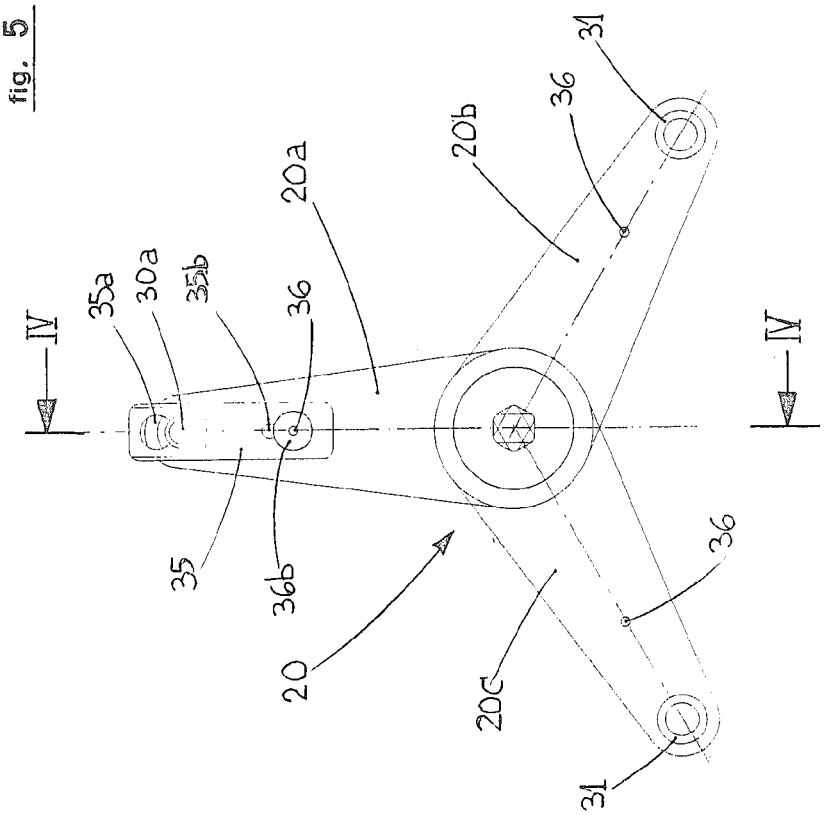
FIG. 5 is a plan view of the part as shown in FIG. 4 of the mixer as shown in FIGS. 1 to 3.
Figure 4:
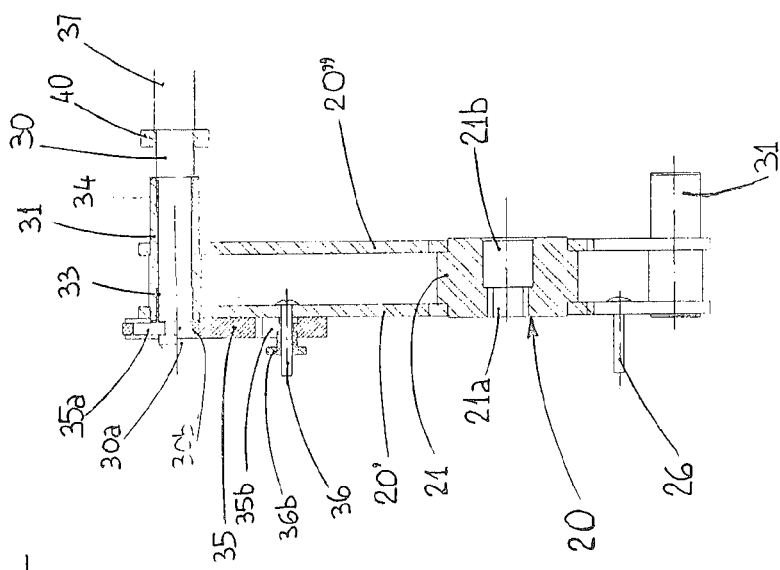
FIG. 4 is a vertically sectional view of a part of the inventive mixer, as taken along the section plane IV-IV of FIG. 5.

In the construction embodiment as particularly shown in FIGS. 4 and 5, a support (20) for the satellite shaft (30) consists of three equally spaced arms (20a, 20b, 20c), each being composed of two walls (20'-20") having one end welded or anyway integral with the hub (21) and the opposite end welded or anyway integral with the liner (31) of the corresponding satellite shaft (30). A pair of bearing brasses (33-34) allows rotation of the satellite shaft (30) on the liner (31), whereas vertical support thereof is ensured by the presence of a screw having a head (30a) and an exposed shank (30b) which is held and positioned within a slot (35a) of a slide (35) Said slide (35) can be moved and positioned along each arm (20a-20b-20c) by means of a screw (36) with a stop nut (36b), which is operative in a second slot (35b) and extends through a hole (21) of each arm (20a-20b-20c). A bearing brass or thrust bearing may be interposed between the head (30a) and the slide (35), for improving support of the rotating shaft (30) and for reducing any rolling friction of the head (30a).

Also referring to FIG. 4 and as mentioned above, the hub (21) has a hole (21a) for receiving the end (15b) of the drive shaft (15), whereas a shoulder (21b) thereof provides support and abutment for the hub (21) against the shaft (15) as the assembly is secured by the nose (16). The stability of the joint between the shoulder (15b) and the hub (21) may be also ensured by mutual keying, to constrain the motion of the support (20) to follow the rotary motion of the planetary shaft (15).

Particularly referring to FIGS. 1 and 3, the satellite shaft (30) has an intermediate part with a shoulder (37) adapted to support a sprocket (40), which is suitably keyed or otherwise integrally joined to the shaft (30) and directly meshes with a gear wheel (41) concentric with the drive shaft (15).

More in detail, this gear wheel (41) is integrally joined to a sleeve (42) which is coaxial and integral with the liner (12), as it has an upper cylindrical surface (42a) with an appropriate through hole for the passage of a suitable packing gland (43), screwing onto the upper edge of the liner (12) and having one or more seals (44) to prevent any leakage of the material being processed in the bowl (10). A spacer (45) is also interposed between the base of the hub (21) and the cylindrical head (42a) of the sleeve (42).

As exemplarily shown in the various figures annexed herewith, the free ends (37) of the satellite shafts (30) are used for mounting one or more mixing (38) and/or cutting (39) tools which are circularly displaced with their respective shafts (30) within the bowl (10).

Referring to FIG. 1, the present mixing machine is also complemented by the possible presence of a lid (50), whose edge (51) may also be hermetically sealed against the edge (10a) of the bowl (10), to provide better conditions for temperature and atmosphere control in the material being processed, and to allow easy and quick removal and application, according to some of the above mentioned objects.

As a result of the above, by operating the drive shaft (15) with a low rpm, in accordance with the desired displacement speed to be imparted to the material being processed in the bowl (10), the support (20) and its respective satellite shafts (30) also undergo a simultaneous circular displacement within the bowl (10).

The circular displacement of each shaft (30) with its sprocket (40) integral therewith causes the sprocket (40) to follow the gear wheel (41), which is stationary and integral with the liner (12) and its sleeve (42) and hence forces the shaft (30) and the tools (38-39) associated with its end (37) to simultaneously rotate about its axis, the speed of such rotation being inversely proportional to the ratio of the teeth of the sprocket (40) to the teeth of the crown (41), thereby imparting a high speed epicyclic motion to such tools (38-39), while receiving thrust from a single motor whose shaft (15) may rotate at low speed, and hence in the best power saving conditions, to ensure the best mixing conditions even under controlled temperature and/or atmosphere, according to the main purpose of the present invention.

The structural simplicity of the lid (50), the lack of any operative constraint thereof on motion transfer, and perfect seal and insulation thereof on the edge of the bowl (10) allow the simplest application thereof, even during maintenance of the machine, according to other objects as mentioned above.

The high simplicity and reliability of the system for transferring motion to the planetary shaft and the satellite shafts, as well as the availability of every surface of the bowl (10) and its bottom (11), as well as its lid (50) for any heating and heat insulation purpose, allow fulfillment of corresponding objects among those mentioned above.

As mentioned above, the construction embodiment as described and illustrated herein shall be of course intended as merely illustrative and without limitation. For example, there may be provided a support (20) having a different number of arms (20a-20b-20c) and each arm may be composed of a different number of plates (20'-20") for connecting the hub (21) to the lateral liners (31). Also, there may be provided a backup device for the shafts (30) other than the one exemplified by the slide (35) and the bolt head (30a), and there may be also a single cylindrical body including the liner (12) and the sleeve (42).

According to a further construction variant, two or more crown wheels (41) of the sleeve (42) may be provided for association with two or more sprockets (40) with different numbers of teeth, subject to application of a device for axial displacement of the shaft (30), to change the mixing speed of the tools (38-39) according to any type of material being processed.

These and other similar changes or adaptation shall be intended to fall within the scope of the invention.

Whereas particular embodiments of this invention have been described above for purposes of illustration, it will be evident to those skilled in the art that numerous variations of the details of the present invention may be made without departing from the invention as defined in the appended claims.

The invention claimed is:

1. A mixing or cutting machine adapted for food processing, for putting a product to be mixed into rotary motion comprising:
    a circular processing bowl,
    a main or planetary drive shaft being coaxial with the bowl and having a lower end coupled to a power take-off that comprises rotating means, wherein:
    the main drive shaft is vertically supported and guided by a first liner which is integral with the base of the bowl, whereas the opposite end of the main drive shaft is integral with a hub having at least one radial arm, with a second liner fitted thereto for supporting and guiding at least one secondary vertical shaft, the at least one secondary vertical shaft being integral with a pinion directly meshing with a crown wheel, the crown wheel being fitted to a sleeve which is coaxial and integral with the planetary drive shaft supporting and guiding the first liner, the at least one secondary vertical shaft being equipped with at least one mixing or mechanical processing tools,
    the first liner is integrally joined to the base of the bowl and comprises an outer portion projecting out of the base and an internal portion extending over substantially the entire length of the bowl, and
    the lower end of the main drive shaft projecting out from the outer portion of the first liner being adapted for defining a lower space from the base of the bowl, the base being used as an additional heating surface,
    wherein the cylindrical bowl has the base integrally joined to the first axial liner, two bearings being placed in the bore of the first liner for supporting and guiding the rotation of the main drive shaft, whose lower end extending through the lower space is coupled to the power take-off for connection to a gearmotor, which imparts the desired rotary motion thereto,
    wherein the opposite end of the main drive shaft is located at such a height as to indicatively reach the upper edge of the bowl and is threaded to be held in and closed by an end cap, which cap screws onto the end of the main drive shaft thereby pressing the underlying hub of the support for the secondary vertical shafts which hub is backed up by a shoulder of the main drive shaft with which it is unremovably joined, and keyed, to rotate at the same speed as the latter, and
    wherein the support for the secondary vertical shaft comprises one or more arms, each having one end welded or integral with the hub and the opposite end welded or integral with a secondary liner of the corresponding secondary vertical shaft, the secondary liner comprising a pair of bearing brasses that is adapted to allow the rotation of said secondary vertical shaft on the secondary liner, whereas vertical support thereof is provided by a screw having a head and an exposed shank which is held and positioned within a slot of a slide.

2. The machine as claimed in claim 1, wherein the slide is moved and positioned along each arm by means of a screw with a stop nut, which is operative in a second slot and extends through a hole of each arm, with a bearing brass or thrust bearing interposed between the head of the screw and the slide for supporting the rotating of the secondary vertical shaft and for reducing any rolling friction of the head.

3. The machine as claimed in claim 1, wherein the hub of the support has a hole for receiving the end of the main drive shaft, whereas the shoulder thereof provides support and abutment for the hub against the main drive shaft as the assembly is secured by the nose by providing stabilization by mutual keying.

4. The machine as claimed in claim 1, wherein the secondary vertical shaft has an intermediate part with a shoulder adapted to support a sprocket, which is suitably keyed or otherwise integrally joined to the secondary vertical shaft and directly meshes with a gear wheel concentric with the main drive shaft.

5. The machine as claimed in claim 4, wherein the gear wheel is integrally joined to the sleeve which is coaxial and integral with the first liner, the gear wheel has an upper cylindrical surface with an appropriate through hole for the passage of a packing gland, the packing gland being screwed onto the upper edge of the first liner and having one or more seals to prevent any leakage of the material being processed in the bowl, a spacer being also interposed between the base of the hub and the cylindrical surface of the sleeve.

6. The mixing or cutting machine as claimed in claim 1, further comprising a lid, whose edge is hermetically sealed against the edge of the bowl.

7. The mixing or cutting machine as claimed in claim 1, wherein the support for the secondary vertical shaft comprises a plurality of the arms, with each arm comprising a plurality of plates for connecting the hub to the secondary liner.

8. The mixing or cutting machine as claimed in claim 1, wherein the support for the secondary vertical shaft comprises a backup device for supporting the secondary vertical shaft in addition to the slide and the screw head.

9. The mixing or cutting machine as claimed in claim 1, wherein the first liner comprises a single cylindrical body.

\* \* \* \* \*